United States Patent
Bouchier et al.

(10) Patent No.: US 6,918,052 B2
(45) Date of Patent: *Jul. 12, 2005

(54) MANAGING OPERATIONS OF A COMPUTER SYSTEM HAVING A PLURALITY OF PARTITIONS

(75) Inventors: Paul H. Bouchier, Little Elm, TX (US); Christine Koerber, Dallas, TX (US); Ronald E. Gilbert Jr., Plano, TX (US); Robert Alan Hasty, Carrollton, TX (US); Janis Delmonte, Farmers Branch, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 87 days.

This patent is subject to a terminal disclaimer.

(21) Appl. No.: 10/700,218

(22) Filed: Nov. 3, 2003

(65) Prior Publication Data

US 2004/0107383 A1 Jun. 3, 2004

Related U.S. Application Data

(63) Continuation of application No. 09/561,812, filed on Apr. 29, 2000, now Pat. No. 6,684,343.

(51) Int. Cl.[7] .......................... H03K 19/30; H04L 1/22; H04B 1/74
(52) U.S. Cl. .............................. 714/4; 714/10; 714/11; 710/316; 710/312; 713/340
(58) Field of Search ................................. 710/305–306, 710/308–317, 63; 714/2–10, 23, 43, 48, 11; 713/324–340, 200–201; 709/201–203, 216–219

(56) References Cited

U.S. PATENT DOCUMENTS

| | | |
|---|---|---|
| 5,113,523 A | 5/1992 | Colley et al. |
| 5,163,052 A | 11/1992 | Evans et al. |
| 5,175,824 A | 12/1992 | Sodebery et al. |
| 5,694,607 A | 12/1997 | Dunstan et al. |
| 5,701,440 A | 12/1997 | Kim |
| 5,781,434 A | 7/1998 | Tobita et al. |
| 5,907,670 A | 5/1999 | Lee |
| 5,948,087 A | 9/1999 | Khan et al. |
| 6,088,770 A | 7/2000 | Tarui et al. |
| 6,112,271 A | 8/2000 | Lanus et al. |
| 6,243,838 B1 | 6/2001 | Liu et al. |
| 6,279,046 B1 | 8/2001 | Armstrong et al. |
| 6,289,467 B1 | 9/2001 | Lewis et al. |
| 6,378,021 B1 | 4/2002 | Okazawa et al. |
| 6,378,027 B1 | 4/2002 | Bealkowski et al. |
| 6,453,344 B1 | 9/2002 | Ellsworth et al. |
| 6,516,372 B1 | 2/2003 | Anderson et al. |
| 6,684,343 B1 * | 1/2004 | Bouchier et al. .............. 714/4 |

* cited by examiner

*Primary Examiner*—Paul R. Myers
*Assistant Examiner*—Raymond N Phan

(57) ABSTRACT

The inventive multiple partition computer system allows the reconfiguration of the installed hardware, possibly while the various partitions continue normal operations. This aspect includes adding and removing process cell boards and I/O from partitions which may or may not continue to run. The invention also allows changes to the association between cells, I/O and partitions. The partitions may be able to stay running, or may have to be shut down from the resulting changes. In the invention, multiple copies of the OS are running independently of each other, each in a partition that has its own cell boards with processors and memory and connected I/O. This provides isolation between different applications. Consequently, a fatal error in one partition would not affect the other partitions. A network of microcontrollers connected to a service processor, via a communications link, provides the service processor with information on each of the different cells, as well as a pathway to receive requests for configuration changes, and a pathway to command changes in the different cells or I/O. The invention allows system control features such as power on/off, status display, etc. for multiple cabinets under control of the service processor.

28 Claims, 7 Drawing Sheets

MANAGING OPERATIONS OF A COMPUTER SYSTEM HAVING A PLURALITY OF PARTITIONS

This application is a continuation of Ser. No. 09/561,812 filed on Apr. 29, 2000 now U.S. Pat. No. 6,684,343.

RELATED APPLICATIONS

The present application is related to co-pending applications U.S. patent application Ser. No. 09/562,590, entitled "RECONFIGURATION SUPPORT FOR A MULTI PARTITION COMPUTER SYSTEM," and U.S. patent application Ser. No. 09/548,464, entitled "POWER MANAGEMENT ALGORITHMS FOR LARGE COMPLEX SYSTEMS WITH HOT-SWAPPABLE ENTITIES," which are incorporated herein by reference.

TECHNICAL FIELD

This invention relates in general to multi-processor computer systems, and in specific to a service processor that supports a multi-processor computer system.

BACKGROUND

Prior computer platforms have been symmetric multi processors (SMP) arrangements where multiple CPUs are running a single copy of the operating system (OS). The OS provides time sharing services to allow multiple applications to run. However, this arrangement permits the applications to interfere with each other. For example, if the system is running an accounting application, the accounting application can allocate all the memory in the system, as well as use all the processors that the OS can allocate. Then, when some other application, for example a manufacturing application, would not be able to allocate any memory or processors for its needs, and therefore would freeze. Thus, the manufacturing application would have been frozen or impacted by the accounting application. This arrangement also leaves the system vulnerable to failures. Any problem with one application would corrupt the resources for all applications.

A known solution to this problem is to separate the computer system into partitions. These partitions are hardware separations which place resources into separate functional blocks. Resources can be flexibly assigned to partitions. Resources in one block do not have direct access to resources in another block. This prevents one application from using the entire system resources, as well as contains faults and errors. An example of such a system is the Sun Microsystems UE10K.

This solution presents its own problem, namely system support and management. The assignment of hardware resources to partitions is flexible, and yet the user needs to be able to monitor and control the operation of the multiple partitions and the hardware assigned to them, to perform operational and diagnostic and debugging functions. These capabilities need to be provided regardless of the configuration of the partitions.

SUMMARY OF THE INVENTION

These and other objects, features and technical advantages are achieved by a system and method which allows for management of the partitions and the hardware that they run on.

Several terms are defined in this paragraph which are necessary to understand the concepts underlying the present invention. A complex is a grouping of one or more cabinets containing cell boards and I/O, each of which can be assigned to a partition. Partitions are groupings of cell boards, with each partition comprising at least one cell. Each partition would run its own copy of system firmware and the OS. Each cell board can comprise one or more system CPUs together with system memory. Each cell board can optionally have I/O connected to it. Each partition must have at least enough I/O attached to its cell board(s) to be able to boot the OS. I/O (Input/Output subsystem) comprises an I/O backplane into which I/O controllers (e.g. PCI cards) can be installed, and the I/O controllers themselves. Cell boards in each cabinet are plugged into a backplane that connects them to the fabric. The fabric is a set of ASICs that allow the cells in a partition to communicate with one another, potentially across cabinet boundaries.

Cell boards are connected to I/O controllers in such a way that software or firmware running on a partition can operate the I/O controllers to transfer data between system memory and external disks, networks, and other I/O devices. One particular type of I/O controller is special—the Core I/O controller—which provides the console interface for the partition. Every partition must have at least one Core I/O controller installed. A complex has exactly one service processor.

Thus, with a multiple partition system, multiple copies of the OS are running independently of each other, each in a partition that has its own cell boards with processors and memory and connected I/O. This provides isolation between different applications. Consequently, a fatal error in one partition would not affect the other partitions.

A service processor is used to manage the partitions and the hardware they run on. For certain operations, and external system (e.g. a workstation or a PC) augments the service processor, and works with the service processor to provide certain diagnostic features, namely firmware update and scan diagnostic functions. The user interacts with service processor and/or the external system to perform the management and control functions.

A network of micro-controllers connected to the service processor, via a communications link, provides the service processor with information on each of the different cells, as well as a pathway to command changes in the different cells or I/O.

Therefore it is a technical advantage of the present invention to provide access to system control features such as power on/off, status display etc for multiple cabinets under control of the service processor.

It is another technical advantage of the present invention to allow commands which reference partitions (e.g. reset) to act on the collection of cells that form the partition. Partitions are referenced by the partition name and the service processor replicates commands such as reset to all the affected cells.

It is a further technical advantage of the present invention to provide security features to limit access to the system to authorized users It is a still further technical advantage of the present invention to prevent misconfiguring the system such that the power requirements of installed HW would exceed the capacity of the installed power supplies It is a still further technical advantage of the present invention to report the power & environmental status of the complex comprising multiple cabinets It is a still further technical advantage of the present invention to provide JTAG scan capability for multiple cabinets from a single network drop which connects to an external workstation which runs the scan diagnostic.

It is a still further technical advantage of the present invention to provide live display of log events, which can be optionally filtered to include only those from a selected partition.

It is a still further technical advantage of the present invention to provide a live display showing the boot or run state of all the partitions and of all the cells.

It is a still further technical advantage of the present invention to receive log events from multiple partitions and store them in non-volatile memory.

It is a still further technical advantage of the present invention to reflecting log events from all partitions back to the partitions for storage.

It is a still further technical advantage of the present invention to provide OS and system FW debugging capability without requiring additional HW.

It is a still further technical advantage of the present invention to provide a method to update both utilities FW and system FW. System FW must be able to be updated even when the cell is not part of a partition and is unbootable.

It is a still further technical advantage of the present invention to provide all the above features using a low-cost embedded service processor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

Figure 1:
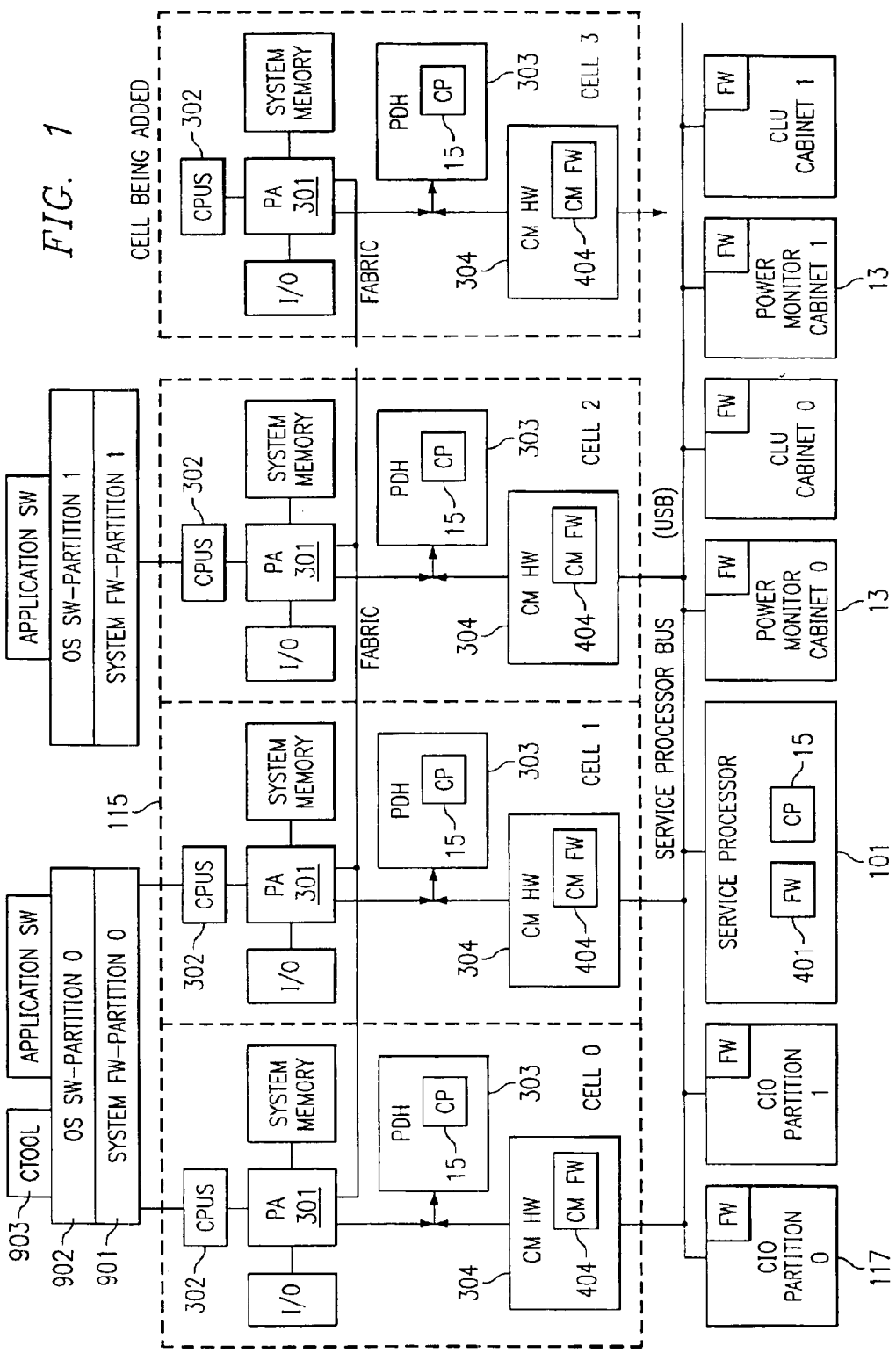
FIG. 1 depicts a block diagram of the inventive system.

FIG. 1 depicts the preferred embodiment for a logical block diagram of the hardware and software architecture of the complex. Each of the major modules is described in the following paragraphs. Many different configurations are possible, involving more or fewer cells configured into different partitions, and more or fewer cabinets. Note that the specific configuration shown in FIG. 1 is just for illustration. Note that only four cells are shown for simplicity but more or fewer cells could be present. Cell 3 is shown disconnected from the rest of the complex. It is unpowered and is not running any software or firmware.

The utility subsystem 10 comprises the service processor 101 and associated infrastructure, including power monitor 13, Cabinet Level Utilities (CLU), CIO, and Cell Microcontroller (CM) 304. The function of the utility subsystem is to manage the complex, including managing partitions when no system software is running. The service processor 101 is logically connected to the CM 304 on each of the different cells, e.g. cell 0, cell 1 and cell 2, and also to the power monitor module 13 for each cabinet, and also to the CLU module for each cabinet, and also to the Core I/O module for each partition The preferred implementation uses the Universal Serial Bus (USB) for the logical connection between components of the utility subsystem. However any bus or method capable of conveying messages between the components could be used.

A cell is a circuit board containing one or more system processors, memory, an I/O connection module, a PDH module, and a CM module. The cell is the smallest unit that can be assigned to a partition. A partition is a cell or group of cells running a single copy of the operating system. A computer system using the inventive utility subsystem can comprise multiple partitions and can run multiple copies of the operating system simultaneously. It could also run multiple different operating systems simultaneously. Partitions form protected areas, wherein different partitions are restricted by hardware from directly accessing each other's memory areas.

The cells are shown connected by fabric. The fabric is a set of ASICs on the backplane of each cabinet in the complex, to which the cells are connected when installed. The fabric routes processor bus operations (e.g. read, write) between the originating cell and memory or I/O on the cell that contains the memory or I/O addressed by the bus operation.

Also shown in FIG. 1 is system firmware 901 running on the processors of cell 0 and cell 1, in partition 0. Cells 0 and 1 are connected by the fabric in such a way that processors on each cell can share the memory and I/O of both cells. Thus they can behave as if they are in a symmetric multi-processor (SMP) comprising the CPUs and memory and I/O in cells 0 and 1 The techniques for making multiple CPUs function as an SMP are well known by those skilled in the art. An SMP is considered to run a single copy of the OS and system firmware.

System firmware 901 interfaces directly to the hardware of the cell and fabric, and to the CM using shared data structures located in memory in PDH 303.

Also running on the system processors of cells 0 and 1 is the operating system (OS) software 902 The OS interfaces with system firmware, which isolates the OS from the hardware The OS causes application software to run on the processors, such as the configuration tool CTOOL 903, and other application software.

FIG. 1 also shows partition 1 comprised of cell 2. Partition 1 has system firmware and an OS and application software running on the processors of cell 2. Partition 1 and its running software are separate and isolated from partition 90—they share nothing, and are isolated from each other by hardware features in the processor agent (PA) 301.

Figure 2:
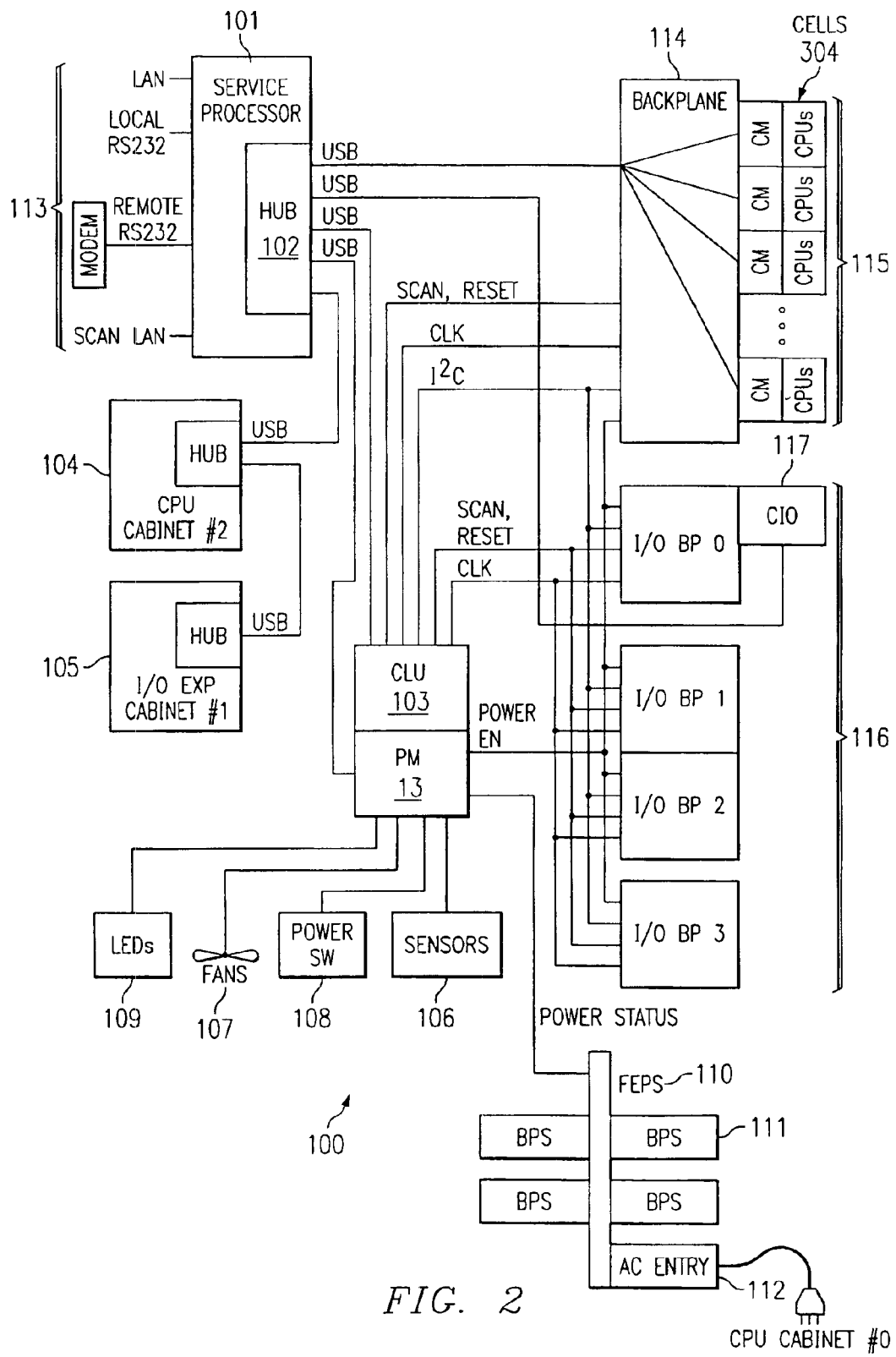
FIG. 2 depicts the preferred embodiment for an arrangement of the hardware architecture for the inventive system.

FIG. 2 depicts the preferred embodiment for an arrangement of the hardware architecture for the inventive utility subsystem and the complex 100. One cabinet of complex 100 contains a single service processor 101. Additional cabinets 104, 105 can be connected to the cabinet containing the service processor to form a larger system The inventive architecture is flexible with regard to controlling multiple cabinets. As shown in FIG. 2, USB can be cabled from the cabinet containing the service processor to other cabinets. Thus, a single service processor can control multiple cabinets. Note that three cabinets are shown as an example; fewer or more cabinets can comprise the larger system. Further note that the cabinets can be I/O expansion cabinet 105, which would only have I/O backplanes and no cells or cell backplanes. The service processor 101 controls the operations of the utilities subsystem.

Cabinet power is delivered by the front end power system (FEPS) 110. The FEPS comprises a plurality of bulk power supplies (BPS) 111. The BPSs can be replaced or added while the cabinet is on-line, i.e. hot-swappable. The BPSs provide DC power to all the subsystem elements, e.g. 48 volts from the AC source 112. The subsystem elements have DC—DC converters to step the input voltage, e.g. 48 volts, down to whatever voltage they require.

The I/O backplanes 116, shown here as four separate backplanes, each comprise a plurality of PCI bays or slots. Other I/O formats could be used, for example ISA or SCSI. The I/O backplanes provide connections between the cells 115 and system I/O devices that are connected to the I/O backplanes. One of the slots comprises the Core I/O (CIO) module 117. This module conveys console data between the service processor and the OS or system firmware running on the partition. The CIO module 117 includes an ASIC which provides a PCI interface to the operating system (OS) for the console The CIO communicates with the service processor via USB.

The cabinet also includes backplane 114 into which the various cells 115 are plugged. The service processor 101 communicates with the cells 115, through the backplane 114 via USB. The cell board comprises a plurality of system microprocessors and associated memory devices. Each cell board includes a cell micro-controller (CM) 304. The CM operates to report status of the cell board, provide the FW update feature for updating FW on the cell, and provide communication between cell board and the service processor, via USB.

Figure 4:
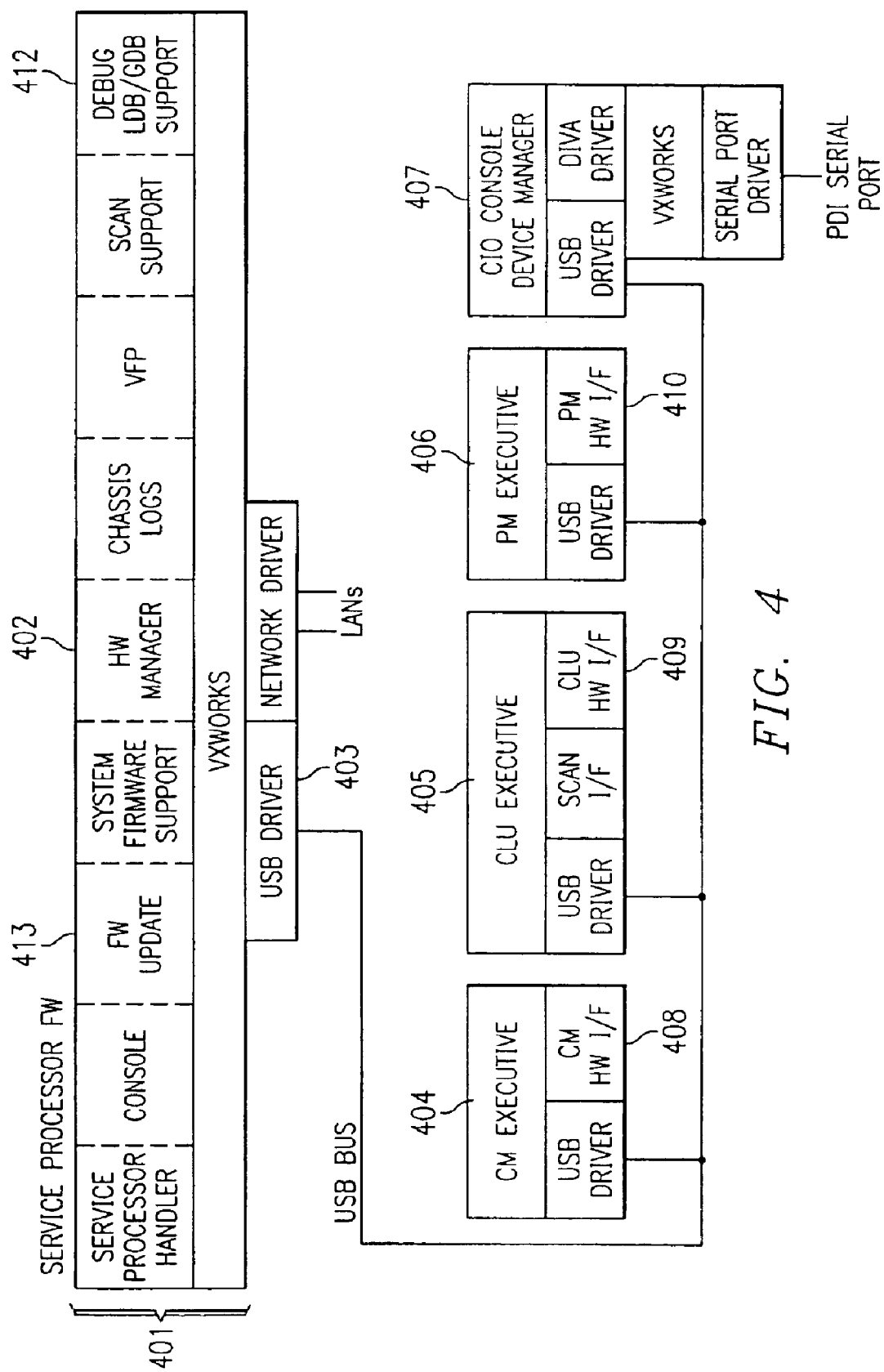
FIG. 4 depicts an arrangement of the utility subsystem firmware architecture.

Referring still to FIG. 2, the architecture and function of components of the utility subsystem will be explained. FIG. 4 provides additional detail and depicts the preferred embodiment for arranging the utility subsystem firmware architecture.

The service processor module 101 includes a USB hub 102 that is used for communications with other elements of the subsystem. The USB hub is universal serial bus (USB) format bus. The USB hub also allows the cabinet to communicate with other cabinets, e.g. 104, 105.

The service processor provides many general supportablity and manageability features such as a user interface to control and monitor the complex. Of particular relevance to the inventive system are the following functions performed by the service processor:
Allow the user to physically connect to the service processor (e.g. RS232 connectors, LAN connectors).
Allow the user to become logically connected to the service processor (e.g. log in).
Provide a user interface (e.g. menus, ability to type commands) to the connected and logged in user, by which means the user can perform monitoring and control operations on the complex hardware, such as power on/off or display status or view logged events.
Allow the receiving and logging of events and the reflection of the logged events to the partitions.
Support the network connection to a JTAG scan diagnostic, and to a firmware update utility and to a debugger.

The service processor firmware 401 is the firmware on the service processor. It includes a hardware manager module 402, which is responsible for managing the complex (e.g. complex profile management, power enabling of the cells) and for reporting the configuration of the complex on demand. The service processor handler module provides a user interface that allows the user to manually control power, interrogate status of hardware, view logs, and other functions described later. The firmware update module allows the user to request the service processor to update system firmware on any cell, or utility firmware on any of the utility micro-controllers, or service processor firmware. The chassis log module manages logged events. The ldb/gdb module manages networked connections from debuggers. The service processor FW is connected to the other utility subsystem FW via a USB line and USB driver 403.

The service processor may be an off-the-shelf processor that is configured via firmware and/or software to operate as the service processor. For example, the service process could comprise an Intel Pentium processor or a HP PA-8500 RISC processor.

The complex 100 includes a power monitor (PM) module 13 in each cabinet that monitors and controls the power supply, e.g. 48V DC, cabinet environment, e.g. ambient temperature, and power distribution to the subsystem elements, e.g. cells and I/O backplanes. Monitoring is accomplished via sensors 106. Environmental control is accomplished via fans 107 or other cooling/heating devices. The PM also has the main power switch 108 for the cabinet. LEDs 109 indicate cabinet status. Note that the PM and the CLU may be mounted on a single board. The PM firmware 406 reports status of the cabinet level power and environmental conditions, as well as the status of other related elements, e.g. FEPS and fans to the service processor 101 via USB. Note that the power monitor does not have to rely on the service processor in order to start up and begin operations.

The cabinet level utilities module (CLU) provides cabinet level clock fanout to the other elements of the sub-system. The CLU 103 provides sub-system reset control and scan support, for example driving the JTAG scan engine. The CLU 103 also reports status of the main backplane and I/O backplanes to the service processor 101, via USB.

The service processor is also connected to the core I/O (CIO) module 117. This module is a circuit board installed in a PCI slot of an I/O backplane 116. Every partition must have at least one CIO. Its function is to provide the console interface for a partition.

The preferred implementation has the cabinet level utilities module (CLU), the power monitor and the service processor and Core I/O implemented as separate microprocessors all connected by the service processor bus. However, other partitioning of the utilities subsystem is possible. For example, the power monitor, CLU, CIO, and service processor could all be on one HW module, or they could be FW modules all running on the service processor. There could even be multiple service processors which might share or alternate in doing the job of complex support. The partitioning of the utilities subsystem is not important to the inventive system. However, the ability for a service processor to control power and to manage and provide support features for the complex is an important aspect of the inventive system.

Figure 3:
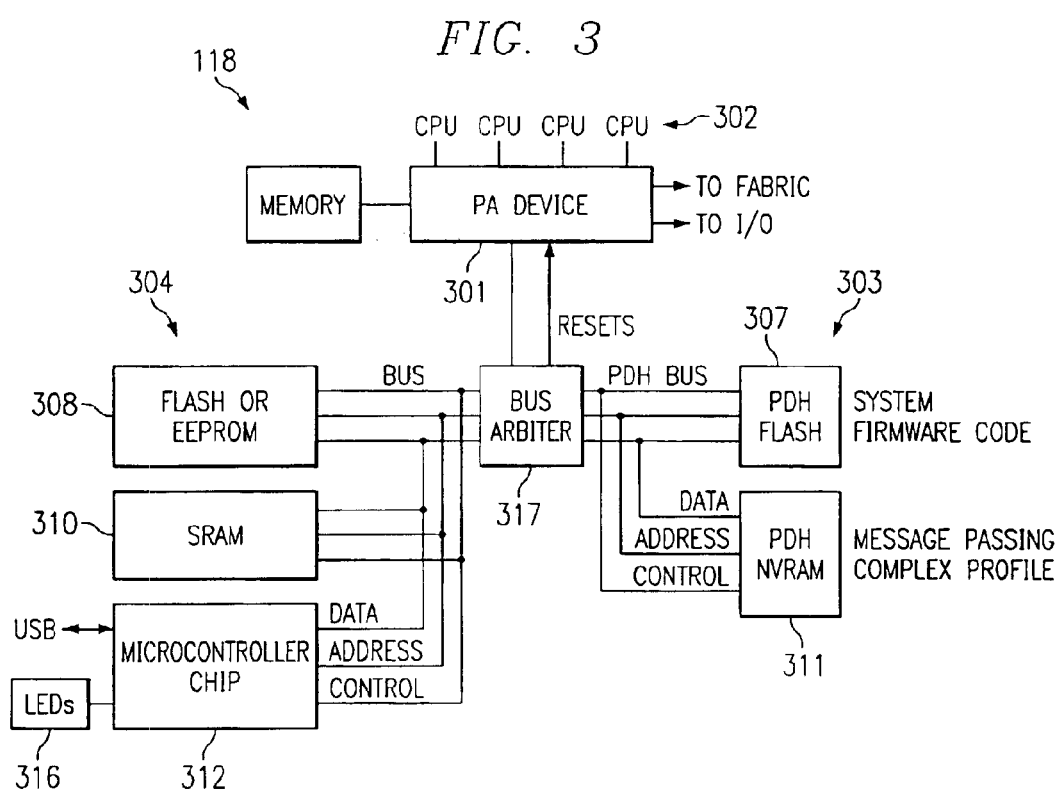
FIG. 3 depicts a block diagram of the cell micro-controller of the inventive system.

FIG. 3 is a block diagram of the preferred embodiment of the cell. There are six major subsystems on the cell:
1. The system processors 302, which execute system firmware, OS, and application code.
2. System memory, which is connected to PA 301, and which is used by the OS, application software, I/O, and some of the time by system firmware.
3. Processor Dependent Hardware (PDH) 303, which contains the PDH flash memory device 307 that holds the system firmware. PDH 303 also contains the PDH NVRAM 311, one segment of which is used by system firmware for working storage, and another segment of which is shared between system firmware and the cell micro-controller 304 (CM).
4. The Processor Agent 301 (PA), which is an ASIC that connects the system processors 302 to system memory, the fabric, I/O, and PDH.
5. The cell micro-controller 304 (CM), which is a micro-controller chip 312 with its boot flash ROM 308 and SRAM 310 and a USB connection to the service processor 101. The CM can access PDH NVRAM 311 via the bus arbiter 317.
6. The bus arbiter 317 which arbitrates requests from the PA 301 and the CM 304 to read or write into PDH memory space.

Each of these subsystems and the way they relate to reconfiguration is described in greater detail in the following paragraphs.

The processor agent (PA) device 301 is an ASIC that connects the system processors 302 to devices in PDH 303, via the bus arbiter 317. The system processors send memory requests through the PA device, which requests the bus arbiter 317 to grant access to PDH 303, and to perform the requested reads and writes.

The CM includes Flash/EEPROM memory 308 and SRAM memory 310. The memory 308 is used to hold FW 404 for the cell micro-controller chip 312. SRAM memory 310 provides RAM for use by FW 404. The cell microcontroller handles communications with the service processor for the CM. The CM also includes some LEDs 316 for indicating status of the cell.

The CM 304 monitors power and environmental conditions on the cell by means of registers that indicate cell status.

The CM also interfaces the system firmware 901 running on the system processors 302 of the cell to the service processor firmware 401. It does so by means of shared data structures located in PDH NVRAM 311.

The CM also updates system firmware code by reprogramming PDH flash 307 upon request from the service processor.

Referring now to FIG. 4, the CM firmware 404 is the FW for the CM of one cell of the cabinet. Thus multiple cells would have multiple CM FW modules connected via USB to the service processor. The CM hardware interface 408 is the firmware module that manages the shared memory areas containing the complex profile and the command queues (described later).

The CM also updates its own firmware code 404 by reprogramming CM flash 308 upon request from the service processor. This CM firmware update feature can be important because the utility subsystem firmware must be compatible in order for complex management to operate correctly. Incompatible firmware revisions on different cell's CM modules could happen for example if a cell that is to be added to a partition was manufactured at a different time with a different revision of CM firmware. CM firmware is designed so that firmware update is always possible, even among different revisions of CM firmware and service processor firmware.

Figure 6:
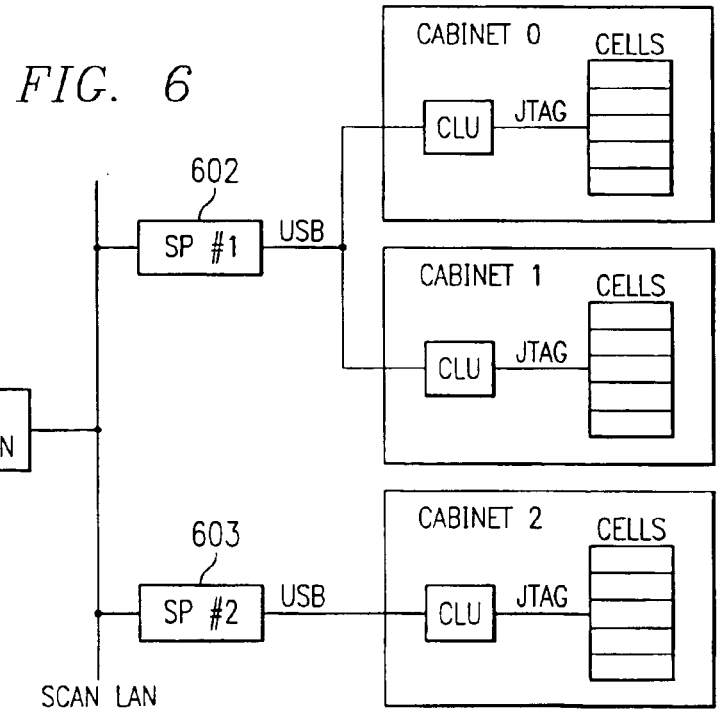
FIG. 6 depicts an arrangement of components that provides the JTAG scan diagnostic feature.

Bus arbiter 317 is used to arbitrate CM PDH bus usage and PA PDH bus usage. Thus, the cell micro-controller 312 and the PA 301 can make interleaved accesses to PDH devices. System processor transactions can be directed down through the arbiter chip into PDH NVRAM memory 311. Moreover, the cell micro-controller 312 can also send read and write transactions through the arbiter chip to PDH NVRAM memory 311. Consequently, the CPUs 301 and the cell micro-controller maintain a set of shared data structures that are located in the NVRAM. The shared data structures are used for communicating different pieces of data, and include log events that the main CPUs 301 can pass to the service processor. Other data structures include the debugger buffers which communicate debugger commands to system firmware. FIG. 6 shows the relevant shared data structures.

The PDH module includes PDH flash memory 307 and non-volatile RAM memory 309. The flash memory 307 holds the system firmware boot code, which is the system firmware layer which boots the machine and abstracts the platform from the OS. System firmware can initiate memory-mapped accesses to devices in PDH. The NVRAM memory 311 holds the complex profile, and is used in message passing between the processors 302, and the cell micro-controller 312. The RAM memory may comprise battery-backed up RAM memory. Note, that although the preferred embodiment uses one CM and one PDH module per cell, it would be possible to implement a CM and PDH that is shared between cells. The system described above can perform the following operations.

Various commands allow the access to system control features such as power on/off, status display, etc. for multiple cabinets under control of the service processor, as well as report the power & environmental status of the system including a multiple cabinet system. The inventive system is flexible with regard to controlling multiple cabinets. As shown in FIG. 2, USB can be cabled from the cabinet containing the service processor to other cabinets. The status of each cabinet can be requested via the user interface. This feature requires that each cabinet have a unique cabinet number.

The preferred embodiment uses the SUB Handler module to provide the user with the ability to perform the following functions. Other implementations may offer the user different capabilities.

View a live display of log events

View a live display of partition and cell boot or run status

View a historical view of log events or console data

Display chassis logs

Display console data history

Display USB topology

Display power and environmental status of utility system entities (SINC, PM3, CLU, SUB, CIO)

Display circuit board part number, revision, and other data from the serial EEPROM on each circuit board Control cabinet voltage and clock margin (e.g. nominal, upper margin, lower margin)

Reset a partition

Power management status and control

Local serial port configuration: speed, flow control, etc.

Remote serial port configuration: speed, modem protocol, etc.

LAN configuration

Access control configuration:
  Login name and password
  User capabilities

Configure the automatic partition reset capability

Configure the capability that pages an operator in case of trouble

Enable/disable access via the remote RS232 port

Configure the initial complex profile

A typical command is the component status command, which displays the power and environmental status of the specified component. The user can retrieve a summary or more detailed information on one of the following: a cabinet, a cell, a core IO and the service processor. The service processor polls the selected component for information, which is returned via USB. For example, entering a cabinet number with the command results in a list of modules present in the cabinet, e.g. cells, CLU, PM, I/O BPs, Core I/Os. Detailed status information is available for each present module, e.g., any failures detected, the power switch on/off, power is enabled/disable and good/poor, fan speed, number of CPUs, number of DIMMs, cell boot enabled/disabled, firmware revision number, etc. Thus, the inventive system uses USB for conveying information and commands between different cabinets on multi cabinet computer system, as well as power and environmental modules in each cabinet connected to one service processor. The inventive system also has commands allowing the user to designate which cabinet they want to address when requesting status or giving commands. The invention uses a cabinet number as a unique handle for naming a set of hardware to be addressed by control/status commands.

The inventive system uses commands which reference partitions (e.g. reset) to act on the collection of cells that form the partition. Partitions are referenced by the partition name and the service processor replicates commands, such as reset, to all the affected cells in a partition. Application of the commands on the cell boards is performed by the CM module. For example, for the command reset, the user can specify which partition they want to reset, then the service processor queries the current complex profile to find out which cells are included in the specified partition. The service processor then sends a message to the CM on each cell configured into the specified partition requesting it to reset that cell. This permits a system design where the reset signals to each cell are independent. This grants the user the ability to give commands that affect aggregations of cells by specifying their partition name. Note that the replication of reset commands is based on the current configuration of the system, wherein distribution of reset commands to a flexible aggregation of cells is determined by the current complex profile. Further note that a partition is an entity that runs a single copy of the operating system, and a partition behaves as an independent computer. Since all of the cells are independent, they each have their own independent reset signal which is driven by the CM on the cell board.

The invention includes security features to limit access to the system to authorized users. A preferred implementation is a security command that allows the service processor administrator to create user names and passwords, and to associate different levels of system capability or accessibility to each of the users. One mechanism is to have a single-partition per user, operator, or administrator levels of capability. The administrator has the highest capability, and can execute any commands. An operator cannot change the configuration of the service processor but can operate on any partitions. So an operator can reset partitions and connect to the console of any partition and generally act as a system administrator for the main computing systems, but they cannot act as an administrator of the service processor itself. A single partition user is the lowest level of access. The single partition user can only issue commands that would affect a single partition, e.g. reset their partition. The function aids the master system administrator to control the activities of their subordinates. This command is implemented in the service processor, which operates to check the users log in name and the capability level and then filtering the commands that they issue. Improper commands are disallowed.

The service processor prevents misconfiguration of the system such that the power requirements of installed hardware would exceed the capacity of the installed power supplies. The service processor and the infrastructure provides configuration support such that it will not allow a configuration that requires more power that is available. Thus, hot-swappable component can be changed without disruption of the power supply. This also ensures that the system will not power up into an unstable state, where it could subsequently crash if there is more hardware installed than the power supplies can handle. As shown in FIG. 2, each of the components requires a certain amount of power, which is supplied by FEPS 110. If an additional component is to be added to the system, e.g., cell 3 in FIG. 1, then the service processor checks to see if there is enough power to satisfy the new component. If not, then the service processor will not allow the new component to power up. If the system is just starting to power up, and there is more power required than is available, the service processor will refuse to power the system up. The different components store their power requirements on an EEPROM, which is read by the PM. The specific details for this function are described in U.S. patent application Ser. No. 09/548,464, entitled "POWER MANAGEMENT ALGORITHMS FOR LARGE COMPLEX SYSTEMS WITH HOT-SWAPPABLE ENTITIES," which is hereby incorporated by reference. Note that it is possible to introduce newer cell boards in the future, which consume different amounts of power, and still retain protection against misconfiguration. The new cell boards would have their power requirements stored into their particular EEPROMs on the board, which can be different from other boards in the system.

The service processor provides JTAG scan capability for multiple cabinets from a single network port. JTAG is IEEE standard 1149.1 and is a serial shift register methodology for performing tests and diagnostics of a digital system. The service processor reports configuration and accepts scan commands for multiple cabinets. The single port aids the configuration of the service processor by minimizing the number of IP addresses that the system needs to consume. IP addresses are frequently in short supply on customer sites. As shown in FIG. 2, the Scan LAN on the service processor is connected to a test station 601, as shown in FIG. 6, e.g. a UNIX workstation. The test station includes files which contain JTAG scan patterns. The test station sends network packets to the service processor(s) 602, 603 of multiple complexes which then forwards those packets across USB to any of the CLUs in any of the cabinets of each complex. The scan support module of the service processor firmware handles translation of scan commands and results between the test station LAN and USB to the CLU(s).

The CLU has a JTAG test bus controller that receives the scan packets from CLU. The scan packets go through scan rings and into the cells, the Backplane and/or the I/O backplanes. The scan packets are shifted through the desired components, and the results are sent back to the service processor, and on to the test station. The results are compared against expected results, and any mismatch indicates a diagnostic failure. The customer would operate the scan system by logging into the test station from the customer LAN and starting up the scan diagnostic program which would then communicate with the service processor and initiate scan.

Figure 7:
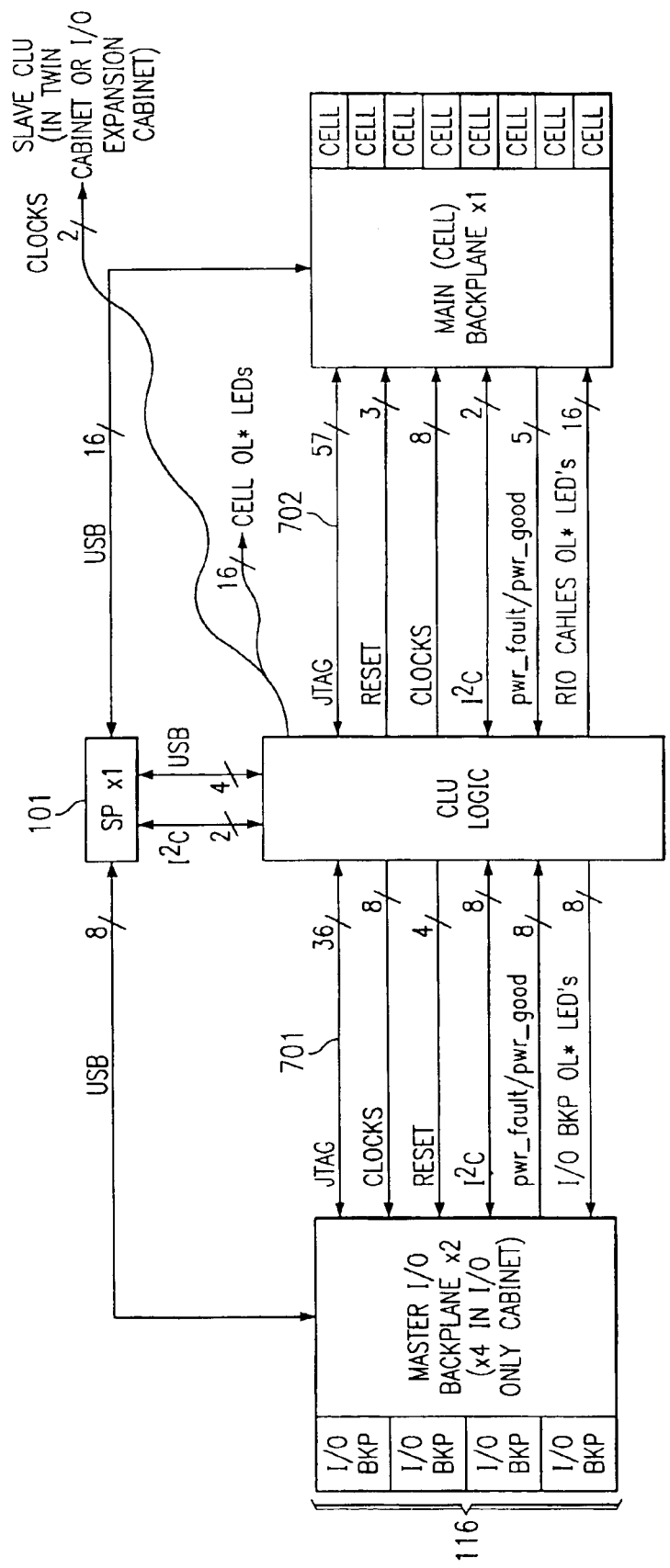
FIG. 7 depicts the arrangement of components in the utility subsystem that perform low level JTAG scan diagnostic operations.

FIG. 7 depicts the scan rings 701, 702. The service processor 101 would receive the packets from the LAN connection, and send it to the CLU via USB. The CLU has JTAG signals going through the Master I/O Backplane via 36 rings or 36 signals 701, to each of the I/O backplanes 116 and also to the Main Backplane with the cells attached it, via 57 signals 702.

The inventive system provides management and display of chassis log events. The service processor can also trigger certain events when chassis logs are received. Chassis logs can be emitted by any of the intelligent entities in the system (OSs or system firmware running in partitions, power monitors, service processor, etc). They are a data item that indicates what caused the log to be emitted, and which entity emitted it, and the severity or alert level of the event. A chassis log is emitted as a result of a system or component event, such as a fault, or other significant event. For example, if the PM detects a failed fan, it emits a chassis log. When system firmware boots, it emits chassis logs as it passes certain important places in the code. Chassis logs travel via the USB from their intelligent source to the service processor. Once in the service processor, the chassis log module of the service processor firmware 401 examines them, stores them, and may display them or take other action, as described below.

Chassis logs have 4 main uses:
Provide a historical view of events on the system. This can help the user manage analysis and repair operations. For example, a power supply failure chassis log emitted by a CM module could indicate the reason why a partition crashed, and that the cell should be replaced. Viewing the stored log of chassis logs is a command that the service processor allows the user to run.

Provide a means for alerting the user that something is wrong. For example, when the service processor detects a chassis log with a high alert level, it could print a message on all connected users' screens, light an LED, dial a paging service to page the operator, etc.

Provide a means to restart a partition if it hangs. The OS can emit a particular type of chassis log periodically which starts a watchdog timer in the service processor. If the OS hangs, it would no longer emit the watchdog timer chassis log. The service processor would detect this, and if it was configured to do so, could reset the partition. Configuring the automatic partition reset feature is a command that the service processor provides to the user.

Provide an indication of the current state of the partitions (running, stopped, booting, etc) and show forward progress as the system boots. This can help the user identify whether the system is booting or running normally. There is a command (mentioned previously) which gives the user a live display of system state. The display is updated as chassis logs are received. The user can also request a live display of chassis logs as they are received. The user can select viewing the display or live chassis logs for a specific partition, or from the entire complex. A menu with the available partitions is presented to the user. Upon making a selection, the user is able to see the chassis codes for that specific partition as they happen. Another entry will display all the chassis codes of the system. The user has the ability to change how the chassis codes are displayed on their screen, e.g. in a hex dump, brief or verbose formats.

Figure 5:
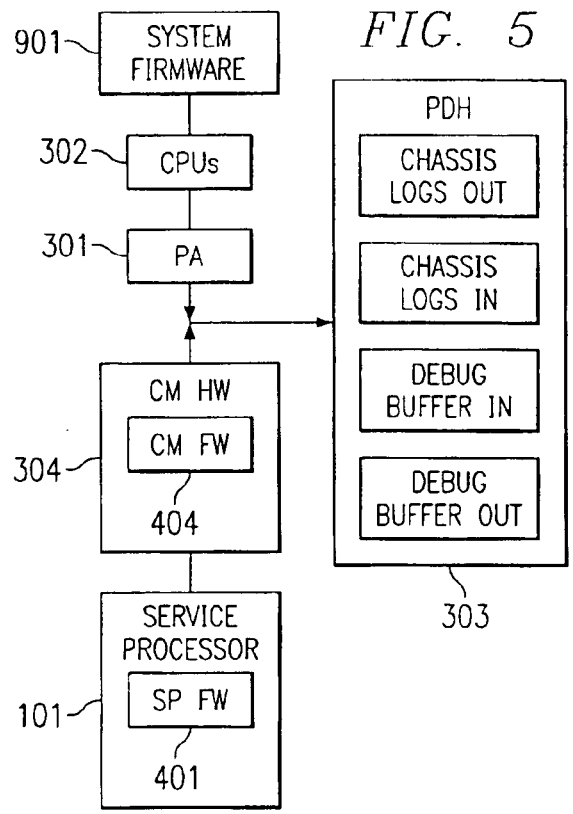
FIG. 5 depicts some of the data structures shared between the service processor and system firmware for accomplishing some aspects of the management function.

Events that generate logs can occur anywhere in the system, for those that occur in system firmware or the OS, their respective logs are stored in the chassis logs out buffer shown in FIG. 5 located in the NVRAM 311 until they are sent to the service processor by the CM. Other logs, for example from an event in the CLU, are sent directly to the service processor for storage.

The service processor includes firmware for storing chassis logs, see 411 of FIG. 4. The service processor could also be programmed to alert the user if a particular chassis log is received.

After processing by the service processor, a copy of all of the logs is sent (or reflected) back to each of the partitions for storage on disk. A cooperative arrangement between the service processor, the operating system and a data storage device, e.g. hard drive or non-volatile RAM memory 311, would permit the operating system to collect the chassis logs and store them for later examination by service personnel. Note that log events or chassis logs could be received from multiple partitions and then stored in an OS log file.

The reflecting operation gives the user viewing logs from the OS log file the ability to inspect the log history for any partition from any other partition. This can be helpful if a partition will not boot. It enables the user to perform analysis of the bad partition by running an analysis tool on a working partition. The stored chassis logs provide a historical view of the events on the system or a particular partition. The chassis logs thus make it easier to manage and service the system, and to monitor the system.

The invention permits debugging system firmware or the OS from a network connected workstation without requiring installation of special debugging HW. Debugging involves two components in addition to the service processor and CM:

1. The debugger client, which runs on a network connected workstation and contains the "brains" of the debugging operation. It can display source files and the current location in the program, and can allow the user to attach to a process, set breakpoints, single step, etc.
2. The debugger stub, which runs on the partition or cell being debugged, and responds to commands from the client by modifying or displaying memory or registers.

Figure 8:
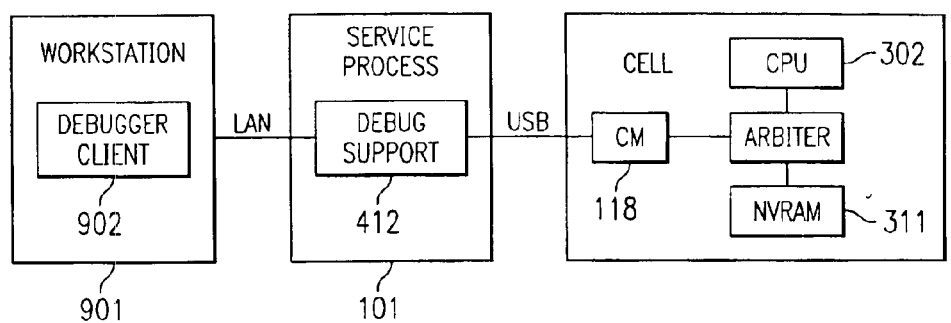
FIG. 8 depicts an arrangement of components which provides the OS debugger feature.

The service processor accepts network connections from an OS or system firmware debugger client. The service processor passes debug packets down to the targeted cell, and signals the debugger stub on the partition that a debug packet is available. This is a built-in debugger support feature that the service processor provides. The operation of this feature is shown in FIG. 8.

A user runs a debugger client 902 on their workstation 901 to debug the OS or FW. The debugger client 902 is a program that can issue debug instructions to a debugger stub running on the system processors. The debugger client 902 sends a packet across the LAN connection (or another connection) from the workstation 901 to the service processor 101, where it is received by the debug support module 412 of service processor firmware 401. The debug support 412 passes it on via USB to a cell 118 that is operating the OS or FW that is to be debugged. The CM of the cell puts the packet into NVRAM 311 and signals system firmware that a packet is available by setting a register bit in the bus arbiter 317 which causes an interrupt to the system processors. System firmware running on the system processors 302 pull the packet from the NVRAM, sets a flag saying the packet has been taken, and passes the packet to the debugger stub which interprets it. The packet could be a command or information. For example, the packet might command the debugger stub to set a breakpoint at an address, or to return the register contents. The debugger stub software running on the system processors acts on the packet and creates a response packet, which is placed into the NVRAM for transit back to the debugger client, via the CM, and the service processor. The stub sets a bit in bus arbiter 317 to inform the CM that a response packet is available. The CM sends the packet to the service processor and sets a bit to inform the stub that it has taken the packet. FIG. 5 shows the debug in and out buffers in NVRAM. When the response gets back to the debugger client, the client can repeat the process by sending another packet.

Figure 9:
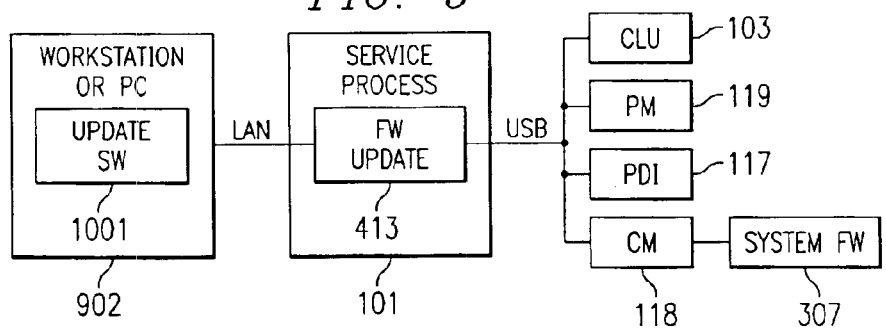
FIG. 9 depicts an arrangement of components that provides the firmware update feature.

The invention also permits updating both utility FW and system FW. Note that system FW must be able to be updated even when the cell is not part of a partition and is unbootable. The problem is that a newly installed cell may have a version of system FW which is incompatible with the versions of system FW in the other cells in the complex. Thus, it would be necessary to update system FW on the new cell to match that of the other cells, or vice versa. In addition, it is necessary to be able to update any of utility processors' firmware. The updating is facilitated by the service processor, in that the service processor can communicate with any other system entity, e.g. the CM, no matter what the boot state of a cell. An external workstation or PC can connect across the network to the service processor and interact with it to obtain the current FW revision levels of the installed entities, and to update the FW. This is shown in FIG. 9.

A user runs the update software 1001 on a workstation 901 or a PC. The update software may affect the FW of any the entities with FW, e.g. service processor, CLU, PM, PDI, CM, or system firmware, as well as the OS running on a particular partition (or some or all of the OSs). The update software sends packets across the LAN (or other connection) to the service processor 101, where it is received by the firmware update module 413. If the service processor is included in the update, then the firmware update module updates the service processors's FW. If other entities are to be updated, then the firmware update module sends a firmware update packet across the USB to the specified module. The specified module brings the data into its memory and updates its FW. If system firmware is to be updated, then the CM module 304 receives the packet and writes the update into the PDH flash 307. The flash ROM 307 contains system firmware code. Thus, the invention uses the service processor and associated infrastructure to provide a supportable way to update the firmware.

Note that the service processor can comprise a commerical processor such as a Pentium processor. The service processor can be upgraded as newer processors emerge.

Although the present invention and its advantages have been described in details it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A multi-partition computer system, comprising:
   a plurality of cell boards, with each cell board including at least one main processor; and
   a service processor that is connected to each of the cell boards;
   wherein each partition includes at least one cell board, each partition is prevented from accessing memory of a different partition, the service processor can command the operations of the partitions, and the service processor can reset a partition.

2. The computer system of claim 1, wherein:
   each partition is running an operating system that is independent of the other partitions.

3. The computer system of claim 1, wherein:
   the service processor communicates with the cell boards via at least one USB format bus.

4. The computer system of claim 1, wherein:
   each cell board may be replaced while the computer system is on-line.

5. The computer system of claim 1, wherein:
   the service processor manages configuration of the partitions.

6. A multi-partition computer system, comprising:
   a plurality of cell boards, with each cell board including at least one main processor; and
   a service processor that is connected to each of the cell boards;
   wherein each partition includes at least one cell board, and the service processor manages operations of the partitions, and each partition is prevented from accessing memory of a different partition, and
   the service processor monitors power requirements and determines whether a new component may be added to the system based upon the power required for the new component.

7. The computer system of claim 6, wherein:
   the service processor can command the operations of the cell boards.

8. A multi-partition computer system, comprising:
   a plurality of cell boards, with each cell board including at least one main processor; and
   a service processor that is connected to each of the cell boards;
   wherein each partition includes at least one cell board, the service processor manages operations of the partitions, each partition is prevented from accessing memory of a different partition, and the service processor monitors log events.

9. The computer system of claim 8, wherein:
   the service processor displays selected log events to a user.

10. A multi-partition computer system, comprising:
    a plurality of cell boards, with each cell board including at least one main processor; and a service processor that is connected to each of the cell boards;

wherein each partition includes at least one cell board, the service processor manages operations of the partitions, each partition is prevented from accessing memory of a different partition, and the service processor monitors status of the cells.

11. The computer system of claim 10, wherein:

the service processor facilitates JTAG scan testing of the computer system.

12. The computer system of claim 10, wherein:

the service processor displays the status of the cells to a user.

13. The computer system of claim 10, wherein:

the service processor monitors environmental condition of the cells.

14. A multi-partition computer system, comprising:

a plurality of cell boards, with each cell board including at least one main processor; and a service processor that is connected to each of the cell boards;

wherein each partition includes at least one cell board, the service processor manages operations of the partitions, each partition is prevented from accessing memory of a different partition, and the service processor updates firmware resident in the cells.

15. A method for operating a computer system having a plurality of partitions and a plurality of cell boards, with each cell board including at least one main processor, wherein each partition includes at least one cell board, the method comprising:

providing a service processor that is connected to each of the cell boards;

managing operations of the partitions via the service processor;

preventing each partition from accessing memory of a different partition;

commanding the operations of the partitions via the service processor; and resetting at least one partition via the service processor.

16. The method of claim 15, further comprising:

running an operating system on each partition that is independent of the other partitions.

17. The method of claim 15, further comprising:

using at least one USB format bus to provide communications between the service processor and the cell boards.

18. The method of claim 15, further comprising:

replacing at least one cell board while the computer system is on-line.

19. The method of claim 15, further comprising:

managing the configuration of the partitions via the service processor.

20. The method of claim 15, wherein:

maintaining security for the computer system via the service processor;

wherein the service processor limits access to authorized users.

21. A method for operating a computer system having a plurality of partitions and a plurality of cell boards, with each cell board including at least one main processor, wherein each partition includes at least one cell board, the method comprising:

providing a service processor that is connected to each of the cell boards;

managing operations of the partitions via the service processor;

preventing each partition from accessing memory of a different partition;

monitoring the power requirements via the service processor; and determining, via the service processor, whether a new component may be added to the system based upon the power required for the new component.

22. The method of claim 21, further comprising:

commanding the operations of the cell boards via the service processor.

23. A method for operating a computer system having a plurality of partitions and a plurality of cell boards, with each cell board including at least one main processor, wherein each partition includes at least one cell board, the method comprising:

providing a service processor that is connected to each of the cell boards;

managing operations of the partitions via the service processor;

preventing each partition from accessing memory of a different partition; and monitoring log events via the service processor.

24. The method of claim 23, further comprising:

displaying selected log events to a user, via the service processor.

25. A method for operating a computer system having a plurality of partitions and a plurality of cell boards, with each cell board including at least one main processor, wherein each partition includes at least one cell board, the method comprising:

providing a service processor that is connected to each of the cell boards;

managing operations of the partitions via the service processor;

preventing each partition from accessing memory of a different partition; and monitoring the status of the cells via the service processor.

26. The method of claim 25, further comprising:

displaying the status of the cells to a user via the service processor.

27. The method of claim 25, further comprising:

monitoring the environmental condition of the cells via the service processor.

28. A method for operating a computer system having a plurality of partitions and a plurality of cell boards, with each cell board including at least one main processor, wherein each partition includes at least one cell board, the method comprising:

providing a service processor that is connected to each of the cell boards;

managing operations of the partitions via the service processor;

preventing each partition from accessing memory of a different partition; and updating firmware resident in the cells via the service processor.

* * * * *